United States Patent [19]

Renshaw

[11] 4,305,714
[45] Dec. 15, 1981

[54] HEAVY DUTY LAMINATED COGGED BELT

[75] Inventor: Guy L. Renshaw, Ash Grove, Mo.

[73] Assignee: Dayco Corporation, Dayton, Ohio

[21] Appl. No.: 152,937

[22] Filed: May 23, 1980

[51] Int. Cl.³ .................... F16H 7/00; F16G 5/16; B29H 7/22

[52] U.S. Cl. .................... 474/250; 156/138; 156/139; 156/142; 474/261; 474/263

[58] Field of Search ............... 156/137, 138, 139, 140, 156/141, 142; 474/250, 261, 262, 263, 265, 251

[56] References Cited

U.S. PATENT DOCUMENTS

| | | | |
|---|---|---|---|
| 1,611,829 | 12/1926 | Freedlander | 474/265 |
| 2,210,073 | 8/1940 | Freedlander | 474/250 |
| 2,281,148 | 4/1942 | Freedlander | 474/263 |
| 2,631,463 | 3/1953 | Waugh | 474/265 |
| 3,416,383 | 12/1968 | Jensen et al. | 474/265 |
| 3,464,875 | 9/1969 | Brooks et al. | 474/263 |
| 3,478,613 | 11/1969 | Waugh et al. | 474/265 |
| 3,995,507 | 12/1976 | White et al. | 156/140 |
| 4,024,773 | 5/1977 | Hartman et al. | 474/265 |
| 4,228,692 | 10/1980 | Jacob et al. | 156/139 |

*Primary Examiner*—William J. Van Balen
*Attorney, Agent, or Firm*—Joseph V. Tassone

[57] ABSTRACT

A heavy duty, raw edge, laminated cogged belt is provided, together with a method for making such a belt. The belt has an inner compression section, an outer tension section and a load-carrying section therebetween. The compression section comprises a first layer of elastomeric material adjacent the load-carrying section, a plurality of layers of relatively thick fabric adjacent the first elastomeric material layer, a second layer of elastomeric material adjacent the thick fabric layers, and a plurality of layers of thinner fabric adjacent the second elastomeric material layer.

15 Claims, 3 Drawing Figures

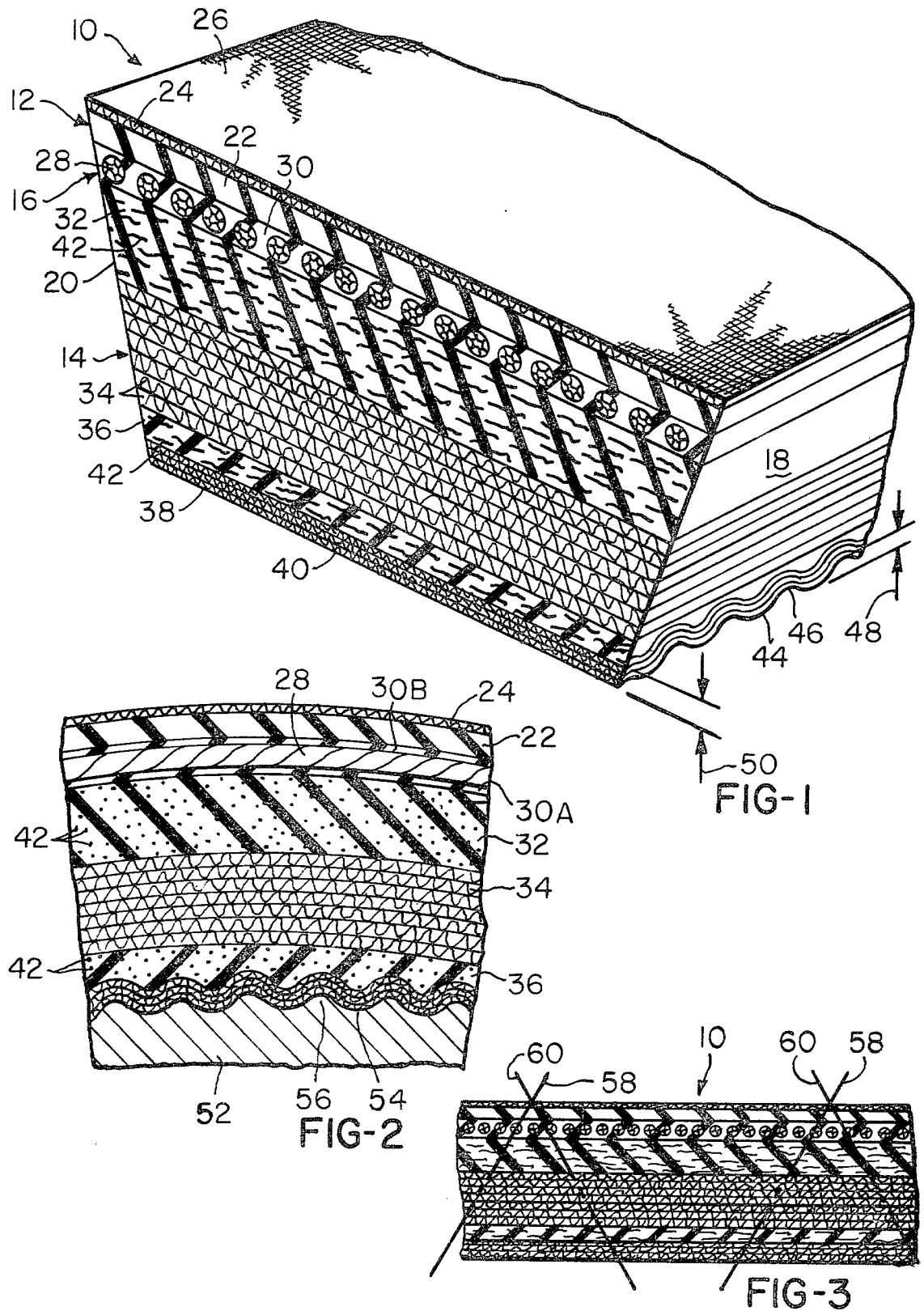

HEAVY DUTY LAMINATED COGGED BELT

BACKGROUND OF THE INVENTION

This invention relates to V-belts.

Among the many problems which arise in the design of V-belts is the constant need to compromise between maximum wear and a high degree of flexibility. Where the pulleys are relatively small in diameter or where a high degree of flexibility is important, belts having teeth or cogs are often preferred to conventional V-belts. Cogged belts have been known for many years, as evidenced by U.S. Pat. Nos. 1,611,829, 2,631,463 and 3,464,875.

On the other hand, laminated belts generally provide better wear resistance than the cogged belts. These laminated belts are partially or wholly built up of a series of laminations or layers of fabric and/or rubber having a plurality of discrete, aligned stiffening fibers distributed therethrough. Belts of this general type are disclosed in U.S. Pat. Nos. 3,416,383 and 3,478,613. U.S. Pat. No. 4,024,773 discloses a laminated belt having a plurality of layers of fabric defining its compression section, wherein the layers of fabric are of different thicknesses. Although this construction provides good wear resistance and a high transverse strength, it lacks the desired degree of flexibility.

There is a need for a V-belt, particularly for agricultural and heavy industrial drive systems, which combines the features of the laminated belt and the cogged belt, i.e., which provides a high degree of flexibility with good wear resistance. Laminated cog belts are known in the art. U.S. Pat. Nos. 2,210,073 and 2,281,148 disclose wrapped, molded laminated belts having transverse grooves in the bottom of the belt. These grooves are relatively shallow, generally having a depth less than the thickness of the fabric wrapper, thus contributing relatively little additional flexibility to the belt. U.S. Pat. 3,464,875 discloses a raw-edge cogged V-belt having from 1 to 6 layers of fabric defining the outermost, i.e., cogged, portion of the compression section. These multiple fabric layers improve the wear and life characteristics of this belt by reducing the tendency for cracks to form at the root of the cogs. These multiple fabric layers add relatively little transverse rigidity to the belt at or near the load-carrying section. Further, as the number and/or thickness of the fabric plies is increased, the ability to form cogs decreases.

It is therefore an object of the present invention to provide a novel laminated, cogged belt.

It is another object of the present invention to provide a method for producing a novel laminated, cogged belt.

Other objects, aspects and advantages of the present invention will be apparent to those skilled in the art from a reading of the following detailed desclosure and the appended claims.

SUMMARY OF THE INVENTION

In accordance with the present invention there is provided a raw-edge laminated, cogged V-belt having an inner compression section, an outer tension section and a load-carrying section therebetween, wherein the compression section comprises a first layer of elastomeric material adjacent and bonded to the load-carrying section, a plurality of first layers of fabric of substantial thickness adjacent and bonded to the first elastomeric layer, and a toothed portion adjoining and bonded to the first fabric layers, wherein the toothed portion has a plurality of second layers of fabric each having a thickness less than the thickness of each of the first layers of fabric, one of the second layers defining the inside surface of the belt and the remainder of the second layers disposed inwardly of this inside surface layer, and a layer of elastomeric material disposed between the second fabric layers and the first fabric layer, wherein the depth of the teeth ranges from about 2 to about 10 times the thickness of the second layers of fabric.

Also provided in accordance with the present invention is a method for making the novel belt of this invention which comprises the steps of wrapping one or more layers of fabric around a toothed mold, wrapping a layer of elastomeric material around the first fabric layers, wrapping a plurality of layers of relatively thicker fabric around the elastomeric layer, wrapping another layer of elastomeric material around the relatively thicker fabric layers, placing a load-carrying section around the elastomeric layer and a tension section around the load-carrying section, curing the assembly and cutting individual belts from the cured assembly.

BRIEF DESCRIPTION OF THE DRAWING

In the drawing:

FIG. 1 illustrates the novel cogged, laminated V-belt of this invention;

FIG. 2 illustrates the building up of the various layers of the belt on a toothed mandrel; and FIG. 3 illustrates the step of cutting individual belts from the cured assembly.

DETAILED DESCRIPTION OF THE DRAWING

In the drawing, FIG. 1 illustrates a belt 10 which has a tension section 12, a compression section 14 and a load-carrying section 16 therebetween. The belt 10 is known in the art as a raw-edge V-belt, that is, the non-parallel driving edges 18 and 20 are not covered and the belt 10 has a trapezoidal shape.

The tension section 12 of the belt is comprised of a plurality of layers including a layer 22 of elastomeric material and at least one fabric layer 24. The fabric layer 24 has a surface which may be considered an exposed outer surface which defines the outside surface 26 of the belt 10.

The load-carrying section 16 may be made of any suitable material or materials and in this example is comprised of a helically-wound load-carrying cord 28 which is embedded in an elastomeric matrix 30, such as neoprene rubber, to provide a cushion on opposite sides of and completely around the cord 28. The helically-wound load-carrying cord 28 may be made of any suitable material known in the art and similarly the elastomeric matrix or cushion 30 may be also made of any suitable material which is compatible with the materials used to define the compression section 14, as hereinafter described, and the layer 22 of the tension section 12, to assure a tenacious bond therebetween. It will also be appreciated that instead of providing a helically-wound load-carrying cord 28, any other suitable load-carrying means may be provided in the belt 10.

The compression section 14 of the belt 10 is comprised of a plurality of layers including a layer 32 of elastomeric material, a plurality of layers 34 of substantial thickness, a layer 36 of elastomeric material and a plurality of layers of fabric 38 having a thickness less than the thickness of the fabric 34. In the exemplary embodiment shown in FIG. 1, the compression section comprises seven layers of fabric 34 and three layers of fabric 38, with one of the layers 38 having a surface which may be considered an exposed outer surface that defines the inside surface 40 of the belt 10.

The compression section 14 also comprises a plurality of teeth defined by alternating projections 44 and recesses 46. The depth of the recesses, i.e., the tooth depth, as indicated by the reference numeral 48, may range from about 2 to about 10 times the total thickness of the fabric layers 38, as indicated by the reference numeral 50. It is presently preferred, for reasons of flexibility of the belt 10, that the tooth depth 48 be at least about 3 and up to about 8 times the fabric thickness 50.

The elastomeric layers 32 and 36 may each have a plurality of homogeneously dispersed fibers 42 embedded therein. The fibers 42 may be made of any suitable material, such as, for example, nylon, cotton, polyester, rayon, aramid, and the like, including mixtures thereof. The fibers 42 each have a diameter in the approximate range of 0.001 to 0.005 inch, and a length in the approximate range of 0.001 to several inches. The fibers 42 may be incorporated into the elastomeric material in an amount ranging from about 1 to about 40 percent by weight, based upon the weight of elastomeric material. The fibers 42 are dispersed substantially uniformly throughout the elastomeric material, yet are arranged in random fashion in a substantially infinite number of planes whereby the fiber-loaded layers of the belt are free of clearly defined shear planes parallel to the load-carrying section 16. Each fiber 42 is arranged substantially parallel to each other fiber 42 in the elastomeric layers, and the fiber-loaded elastomeric layers are arranged so that the direction of orientation of the fibers 42 is substantially at a 90 degree angle to the longitudinal dimension or axis of the belt. The fibers 42 may be arranged at other angles, as desired.

As previously mentioned, the belt 10 has a continuous helically-wound load-carrying cord 28. The cord 28 may be made of any suitable material, such as aramid, nylon, fiberglass, polyester or the like.

The elastomeric layers 22, 32 and 36 may also have graphite dispersed therethrough in an homogeneous manner to reduce the co-efficient of friction at the sides 18 and 20 of the belt 10 with an associated pulley. Where graphite is utilized in an elastomeric material comprising one of the elastomeric layers of the belt, the weight of graphite in each layer is roughly in the range of about 10 to 30 percent, by weight, of the elastomeric material.

The fabric layers 34 each have an equal thickness which is substantial, as compared to the thickness of the fabric layers 38. The fabric layers 38 have a thickness which is roughly one-half the thickness of the fabric layers 34. The fabric layers may also be classified in terms of weight per standard unit area. A fabric having a weight in the approximate range of 4 to 8 ounces may be used for the fabric layers 38, and also for the layer 24, and a fabric having a weight in the approximate range of 10 to 14 ounces may be used for the fabric layers 34.

Each of the fabric layers 24, 34 and 38, regardless of its thickness or weight, is a frictioned layer and, as is known in the art, is made by any suitable process such as by calendering, wherein an elastomeric compound is forced between the spaces of the constituent threads, such as the warps and wefts in the case of woven fabric, while providing a substantial thickness of elastomer on each side of the layer. With such a structure there is a more tenacious bond between layers of an associated belt. The frictioned layers have a considerable number of fabric threads or portions exposed at the non-parallel sides 18 and 20 of the belt. These threads cooperate with the anti-friction material incorporated into the elastomeric layers to control the coefficient of friction at the sides of the trapezoidal belt.

The layers 24, 34 and 38 may be made of any suitable fabric material, including non-woven, square woven, bias, stress-relieved, knitted, or the like.

The belt 10 can be made by any procedure known in the art; for example, a belt sleeve can be made by sequentially assembling various layers of materials, curing the sleeve, and then cutting it into the finished products. Referring to FIG. 2, the belt components are assembled upon a grooved mandrel 52 which has a plurality of grooves 54 and projections 56 corresponding to the projections 44 and recesses 46, respectively, in the finished belt. The mandrel 52 may be all metal, as illustrated, or it may be smooth, and a grooved elastomeric matrix used to form the belt teeth.

The belt sleeve is built up by first wrapping from 2 to 6 layers of fabric 38 around the mandrel 52. These fabric layers may, if desired, be stitched, i.e. forced partially or completely into the grooves 54. Second, a sheet of elastomeric material 36 is wrapped around the fabric layers 38. A plurality of from 2 to 10 layers of fabric 34 are then wound around the layer 36 of elastomeric material. As the next steps of the invention, a layer of elastomeric material 32 is wrapped around the fabric 34 and a first layer of elastomeric cushion stock 30A is wrapped around the elastomeric layer 32.

The next step of the invention is the placing of the strength cord 28 about the cushion layer 30A. The cord is spun around the periphery of the assembly in helical fashion. The cord 28 is applied under high tension, approximately five times as great as the tension normally applied to the belt cords when used in manufacturing belts. The axially inward tension applied by spinning the cord 28 causes the various materials heretofor assembled on the mandredl 52 to flow inwardly, thereby, at least partially, filling the grooves 54.

At the completion of the winding step, a second layer of elastomeric cushion stock 30B is placed over the cord 28. This is followed by the layer 22 of elastomeric material and, finally, the fabric layer 24.

The assembled belt sleeve is then subjected to a conventional process whereby the sleeve is vulcanized, or otherwise cured. For example, the sleeve may be placed in a differential mold and subjected to steam which provides the necessary pressure and temperature to complete the vulcanizing process. During this process there will be additional flow of the elastomeric materials through the entire assembly to provide an integral belt sleeve. The material in the compression section 14 will complete its flow to assume the grooved shape of the mandrel 52. The elastomeric cushion stocks 30A and 30B will flow together to surround and embed the cord 28 and form a unitary layer 30.

The sleeve may then be removed from the curing mold and cut into individual belts as illustrated in FIG. 3. The cutting procedure is conventional in the prior art and is performed along longitudinal lines such as 58 and 60.

The terms "elastomer" and "elastomeric material", as used herein and in the claims are intended to mean rubber, both natural and synthetic, and plastic materials which have been or may be used in constructing endless power transmission belts. These terms also comprise compounding ingredients normally employed in rubber and rubber-like compositions such as carbon black, extenders, curing ingredients, antioxidants, antiozonants, and the like.

Various other modifications and embodiments of the invention will be apparent to those skilled in the art in view of this disclosure.

I claim:

1. A raw-edge, laminated, cogged V-belt having an inner compression section, an outer tension section and a load-carrying section therebetween, wherein said compression section comprises a first layer of elastomeric material adjacent and bonded to said load-carrying section, a plurality of first layers of fabric of substantial thickness adjacent and bonded to said first elastomeric layer, and a toothed portion adjoining and bonded to said first fabric layers, wherein said toothed portion comprises a plurality of second layers of fabric each having a thickness less than the thickness of each of said first layers of fabric, one of said second fabric layers defining the inside surface of said belt and the remainder of said second fabric layers disposed inwardly of said inside surface layer, and a layer of elastomeric material disposed between said second fabric layers and said first fabric layers.

2. The belt of claim 1 wherein depth of teeth in said toothed portion ranges from about 2 to about 10 times the total thickness of said second layers of fabric.

3. The belt of claim 1 wherein at least one of said elastomeric layers in said compression section has a plurality of homogeneously dispersed fibers embedded therein.

4. The belt of claim 1 wherein said second fabric layers each have a thickness of about one-half the thickness of each of said first fabric layers.

5. The belt of claim 1 having from 2 to 6 layers of said second fabric.

6. The belt of claim 1 having from 2 to 10 layers of said first fabric.

7. The belt of claim 3 wherein said fibers are arranged at an angle of approximately 90 degrees to the longitudinal axis of said belt.

8. A method for making a raw-edge, laminated, cogged V-belt having an inner compression section, an outer tension section and a load-carrying section therebetween, which comprises the steps, in sequence of wrapping a plurality of layers of relatively thin fabric around a grooved building surface means, wrapping a layer of elastomeric material around said thin fabric layers, wrapping a plurality of layers of relatively thicker fabric around said elastomeric material, wrapping an other layer of elastomeric material around said thicker fabric layers, wrapping a layer of elastomeric cushion stock around said other elastomeric material layer, spinning a strength cord around said cushion stock, wrapping an other layer of elastomeric cushion stock over said cord, wrapping a tension layer of elastomeric material around said other layer of cushion stock, and wrapping a layer of tension fabric over said elastomeric tension layer to provide an assembled belt sleeve, curing said assembled belt sleeve to provide a cured sleeve and cutting at least one belt from said cured sleeve.

9. The method of claim 8 wherein the step of wrapping said relatively thin fabric comprises wrapping from 2 to 6 layers of said fabric.

10. The method of claim 8 wherein the step of wrapping said relatively thicker fabric comprises wrapping from 2 to 10 layers of said fabric.

11. The method of claim 8 wherein said step of wrapping said layer of elastomeric material around said layers of relatively thin fabric comprises wrapping a layer of elastomeric material having a plurality of discrete fibers homogeneously dispersed therethrough and embedded therein.

12. The method of claim 11 wherein said fibers in said fiber-containing elastomeric material are oriented and wherein said layer is wrapped with said oriented fibers arranged at an angle of approximately 90 degrees to the longitudinal axis of the resulting belt.

13. The method of claim 8 wherein said step of wrapping said other layer of elastomeric material comprises wrapping a layer of elastomeric material having a plurality of discrete fibers homogeneously dispersed therethrough and embedded therein.

14. The method of claim 13 wherein the fibers in said other fiber-containing elastomeric material are oriented and wherein said other layer is wrapped with said oriented fibers arranged at an angle of approximately 90 degrees to the longitudinal axis of the resulting belt.

15. The method of claim 8 wherein said step of wrapping said relatively thicker fabric comprises wrapping a fabric having a thickness approximately twice the thickness of said relatively thin fabric.

* * * * *